(12) United States Patent
Gagarin et al.

(10) Patent No.: US 7,215,708 B2
(45) Date of Patent: May 8, 2007

(54) RESOLUTION DOWNSCALING OF VIDEO IMAGES

(75) Inventors: Konstantin Y. Gagarin, St. Petersburg (RU); Kees Van Zon, Coldspring, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 672 days.

(21) Appl. No.: 10/132,041

(22) Filed: Apr. 25, 2002

(65) Prior Publication Data

US 2002/0181592 A1 Dec. 5, 2002

Related U.S. Application Data

(60) Provisional application No. 60/292,715, filed on May 22, 2001.

(51) Int. Cl.
*H04N 7/12* (2006.01)
*H04N 11/02* (2006.01)

(52) U.S. Cl. .................. 375/240.21; 348/441

(58) Field of Classification Search .......... 375/240.29, 375/240.21; 348/441, 427.1
See application file for complete search history.

(56) References Cited

U.S. PATENT DOCUMENTS

| | | | | |
|---|---|---|---|---|
| 5,270,813 A | | 12/1993 | Puri et al. ................... 358/136 |
| 5,767,907 A | * | 6/1998 | Pearlstein .............. 375/240.25 |
| 5,990,812 A | * | 11/1999 | Bakhmutsky ................ 341/67 |
| 6,023,262 A | * | 2/2000 | Eglit ........................... 345/667 |
| 6,310,919 B1 | * | 10/2001 | Florencio ............... 375/240.16 |
| 6,519,288 B1 | * | 2/2003 | Vetro et al. ............ 375/240.21 |
| 6,647,061 B1 | * | 11/2003 | Panusopone et al. .. 375/240.12 |
| 6,665,344 B1 | * | 12/2003 | Fimoff ...................... 375/240.2 |
| 6,704,358 B1 | * | 3/2004 | Li et al. ................. 375/240.02 |
| 6,724,948 B1 | * | 4/2004 | Lippincott ................... 382/298 |
| 6,788,347 B1 | * | 9/2004 | Kim et al. ................... 348/441 |
| 6,798,420 B1 | * | 9/2004 | Xie ............................. 345/554 |
| 6,895,053 B1 | * | 5/2005 | Bailleul ................. 375/240.12 |
| 2001/0055339 A1 | | 12/2001 | Choi | |

FOREIGN PATENT DOCUMENTS

| | | |
|---|---|---|
| EP | 0595218 B1 | 5/1994 |
| EP | 0781052 A2 | 6/1997 |
| WO | 9714252 A1 | 4/1997 |
| WO | 9841929 A2 | 9/1998 |
| WO | 0000907 A1 | 1/2000 |
| WO | 0005898 A2 | 2/2000 |

OTHER PUBLICATIONS

XP002215086.

* cited by examiner

*Primary Examiner*—Gims Philippe
*Assistant Examiner*—Erick Rekstad
(74) *Attorney, Agent, or Firm*—Larry Liberchuk

(57) ABSTRACT

A method and apparatus for downscaling video images to a lower resolution (e.g. from HDTV to SDTV) is presented. The method comprising the steps of frequency domain anti-aliasing filtering and downscaling the first video signal in a first direction corresponding with a line direction in the first video signal to obtain a downscaled video signal, and spatial domain downscaling the downscaled video signal in a second direction perpendicular to the first direction to obtain the second video signal. The method and apparatus of the invention are suitable for efficient and high quality decoding both progressive and any-type encoded interlaced signals.

17 Claims, 5 Drawing Sheets

RESOLUTION DOWNSCALING OF VIDEO IMAGES

CLAIM FOR PRIORITY/CROSS REFERENCE TO RELATED APPLICATION

This application claims priority to U.S. Provisional Application Ser. No. 60/292,715 filed May 22, 2001. The content of the above-identified application is incorporated herein by reference.

FIELD OF THE INVENTION

This invention relates to downscaling spatial resolution in video signals such as high definition television (HDTV) signals. More specifically, this invention relates to downscaling the resolution of HDTV signals to be commensurate with the resolution of standard definition television (SDTV).

BACKGROUND OF THE INVENTION

Television, since its introduction into the commercial markets, has become a ubiquitous product that has reached into every corner of daily life. Television, whether broadcast television or cable television, provides viewers with more information about changes in the world than any other news form or media. As such the number of televisions sets that are in operation is in the hundreds of millions.

Current television technology, termed Standard Definition Television (SDTV), is based on an analog technology that was developed and standardized in the mid-portion of the 20th century. These long established television broadcast standards for frequency allocation, format, etc., impose limits upon the amount of information that can be transmitted and, consequently, viewed by a user. Newer digital television technology, termed High Definition Television (HDTV), designed to overcome the limitations of SDTV, is able to increase the amount of the data transmitted by digitizing and compressing the television signal before transmission. A significant advantage of HDTV over SDTV is that the increased data transmission improves the clarity of the viewed image. The clarity is improved by transmitting an image having greater resolution than SDTV transmission.

As the number of HDTV transmissions begin to increase in conjunction with the existing SDTV transmissions, hundreds of millions of SDTV television sets must be adapted to receive the new HDTV signals. Adapting SDTV television sets to HDTV formats may be easily accomplished by adding a converter box, e.g., a set-top box, to spatially downscale the received HDTV signal to a format acceptable for viewing on the SDTV television set. Techniques to spatially downscale from HDTV to SDTV are well known in the art.

WO97/14252-A1 discloses a method and apparatus using the discrete cosine transform (DCT) to resize the image. To reduce an image, the method and apparatus exploit the convolution-multiplication property of the DCT to implement the anti-aliasing filter in the DCT domain, then the filter coefficients are operated on to produce DCT coefficients of the reduced-size image.

EP 0 781 052-A2 discloses a decoder for decoding MPEG video bitstreams encoded in any color space encoding format and outputting the decoded video bitstream to different size windows. Both MPEG decompression and color space decoding and conversion are performed on the bitstreams within the same decoder. The disclosed decoder may be programmed to output the decoded video bitstream in any of three primary color space formats comprising YUV 4:2:0, YUV 4:2:2 and YUV 4:4:4. The decoder may also output the decoded bitstream to different sized windows using DCT based image resizing.

SUMMARY OF THE INVENTION

An object of the invention is to provide a more advantageous resolution downscaling, in particular for encoded video signals including both field-type encoded groups of pixels and frame-type encoded groups of pixels. To this end, the invention provides a method and an apparatus according to the independent claims. Advantageous embodiments are defined in the dependent claims.

According to a first aspect of the invention, frequency domain anti-aliasing filtering and downscaling is performed in a first direction (e.g. horizontal) corresponding with a line direction in the first video signal and spatial domain downscaling is performed in a second direction (e.g. vertical) perpendicular to the first direction. The downscaling in the first direction may be performed prior to or during an inverse frequency transform operation. The invention is based on the insight that a given type of frequency domain anti-aliasing filter which is applied in the second direction for both field-type encoded groups of pixels and frame-type encoded groups of pixels corresponds to different filter types in the spatial domain. This is a consequence of the fact that field-type groups of pixels usually include two separate transform encoded fields (e.g. top field and bottom field) whereas frame-type groups of pixels usually include information corresponding to two fields mixed in one frame which is transform encoded as a whole. Filtering field-type and frame type encoded groups of pixels differently in the spatial domain may lead to significant errors arising during inverse motion compensation in the case that both field-type and frame-type encoded groups of pixels are present in the video signal. By frequency domain anti-aliasing filtering and downscaling in the line direction and spatial domain downscaling in the perpendicular direction, these errors are reduced. The method and apparatus of the invention are therefore suitable for handling interlaced video signals comprising mixed frame/field type groups of pixels, interlaced signals without mixed frame/field type encoded groups of pixels (e.g. only field type encoded groups of pixels) as well as progressive video signals with frame-type encoded groups of pixels without major modifications to the method or apparatus.

In a practical embodiment, spatial domain anti-aliasing filtering in the second direction is performed prior to the spatial domain downscaling in the second direction.

In an embodiment, the first video signal is downscaled prior to or during an inverse transform operation such as an inverse DCT (IDCT) which transform operation is followed by an inverse motion compensation prior to the spatial domain downscaling in the second direction. This has the advantage that errors which may be introduced by the motion vector downscaling have no effect on the inverse motion compensation in the second direction. The spatial domain downscaling in the second direction is preferably preceded by anti-aliasing filtering in the same direction. The spatial domain downscaling is preferably applied at frame level. This makes it possible to use a filter with long impulse response in the second direction to obtain a sharper frequency cutoff. Advantage of this embodiment is that distortions occurring at block edges due to block-based filtering are present only in the first direction. As inverse motion compensation is performed on one-directional downscaled pictures the memory size required for reference field/frame storing is reduced compared with traditional full spatial domain scheme. The memory reduction depends on horizontal scaling factor.

Preferably, the spatial domain downscaling is performed prior to the inverse motion compensation. Due to the vertical spatial domain downscaling prior to inverse motion compensation, the memory size needed for storing a reference field/frame for the inverse motion compensation is reduced to e.g. half the size in the case the downscaling reduces the size of the field/frame with 50%. This memory size corresponds to the memory size which is needed for a comparable bi-directional frequency domain downscaling.

In an alternative embodiment, field-type encoded groups of pixels are anti-aliasing filtered in both directions in the frequency domain rather than one direction in the frequency domain and the other in spatial domain. For each frame-type encoded group of pixels horizontal frequency domain anti-aliasing filtering and vertical spatial domain anti-aliasing filtering is performed. In this embodiment, the same frequency domain filter can be applied in horizontal direction for field-type encoded groups of pixels and frame-type encoded groups of pixels. The spatial domain filter which is used in vertical direction for frame-type encoded groups of pixels has to correspond to the frequency domain filter which is used in vertical direction for field-type encoded macroblocks. Due to the vertical downscaling in spatial domain prior to inverse motion compensation, the memory size needed for storing a reference field/frame for the inverse motion compensation corresponds to the memory size which is needed for a comparable bi-directional frequency domain downscaling. The performance of this embodiment is higher because vertical spatial domain filtering, which is usually a slow procedure, is only performed on frame-type groups of pixels and not on field-type groups of pixels. Each frame-type group of pixels is filtered in frequency domain only in the first direction and then downscaled in the first direction during scalable IDCT. After all groups of pixels are decoded in this way, the mixed field information can be separated and each group of pixels is filtered and downscaled in spatial domain in the second direction prior to motion compensation. The field-type group of pixels is frequency domain filtered in both directions but downscaled in one direction in the frequency domain and in the other direction in the spatial domain prior to the inverse motion compensation.

The groups of pixels may be blocks of pixels or macroblocks. In the case of MPEG-2 each 16×16 macroblock consists of four 8×8 blocks of pixels. The interlaced signals can be encoded by the two different modes in e.g MPEG-2: the first is with field type of picture and the second one is with frame type of picture. In the first case each field of picture is coded separately and mixed field/frame macroblock mode is not used. In the second case (the most commonly used) each picture is coded at progressive manner, i.e. two fields are mixed and coded together. For this case the mixed macroblock mode is used. So if one uses the straightforward bi-directional frequency domain down conversion scheme for second way encoded interlaced signals, it leads to error propagation during motion compensation and significant visual quality losses.

Figure 1:
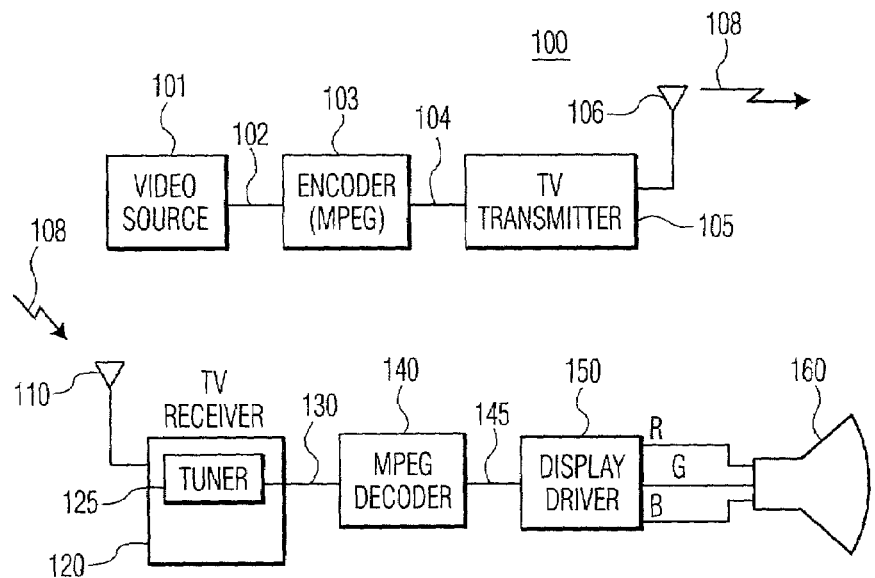
FIG. 1 illustrates an exemplary HDTV transmitting and receiving system.

It is to be understood that these drawings are solely for purposes of illustrating the concepts of the invention and are not intended as a definition of the limits of the invention. It will be appreciated that the same reference numerals, possibly supplemented with reference characters where appropriate, have been used throughout to identify corresponding parts.

DETAILED DESCRIPTION OF THE INVENTION

To understand and appreciate the novel features of the present embodiment, which involve scaling HDTV decoded signals for display on Standard Television screens, it is first necessary to discuss conventional HDTV processes and the problems associated therewith. FIG. 1 illustrates a typical HDTV system. As illustrated, a digital television signal produced by signal generator 101 composed typically of an 8×8 matrix of 64 pixel elements, is compressed by MPEG encoder 103. MPEG encoding is based on the Discrete Cosine Transformation (DCT), a mathematical operation similar to Fourier transformation and well known in the art. MPEG encoder 103 performs, among other operations, a conversion of an exemplary 8×8 matrix of pixels, represented by signal 102, into an 8×8 matrix of coefficients, represented by signal 104. As is known, the resultant DCT transformed matrix stores high-frequency information in the top-left corner of the matrix and the low-frequency information in the bottom-right corner of the matrix. The DCT transformed matrix is then quantized so that 8 bits i.e., one byte, are used to describe the values in each matrix element. The quantized matrix is transmitted, in this illustrative example, by TV transmitter 105 through transmitting antenna 106. Digital video compression techniques, such as MPEG -2, MPEG-4, MPEG-7, which are standards specified by the Moving Pictures Experts Group (MPEG), are well known in the art and need not be discussed in detail herein.

Returning to FIG. 1, the transmitted digital signal 108 is received by receiving antenna 110 and processed by TV receiver 120, which includes tuner 125. Tuner 125 is used to isolate a specific HDTV signal from the plurality of HDTV and SDTV signals received. The isolated signal is then processed by decoder 140, e.g., an MPEG decoder, which decodes the digitally transmitted signal 130 into displayable signal 145. Using, for example MPEG decoding, decoder 140 decodes the received signal and returns the transmitted coefficients to a stream of pixel data ordered by lines and rows. Display driver 150 generates appropriate Red (R), Green (G) and Blue (B) colors signal for display on high-resolution screen 160 based on the received data.

To achieve higher resolution, HDTV images are created with a high resolution. In one case, an image is transmitted with 1920 pixels in each horizontal line and there are 1080 lines, i.e., a resolution of 1920×1080. In a second case, an image is transmitted with 1280 pixels per line and 720 lines, i.e., 1280×720. SDTV television, on the other hand, has a resolution significantly less than that of HDTV. For example, the television transmission system in the United States and Japan, the SDTV system NTSC consists of a resolution of approximately 720×480, i.e., 720 pixels for each of 480 lines. Europe employs the PAL system which uses still a different resolution, i.e., 720×576.

Figure 2:
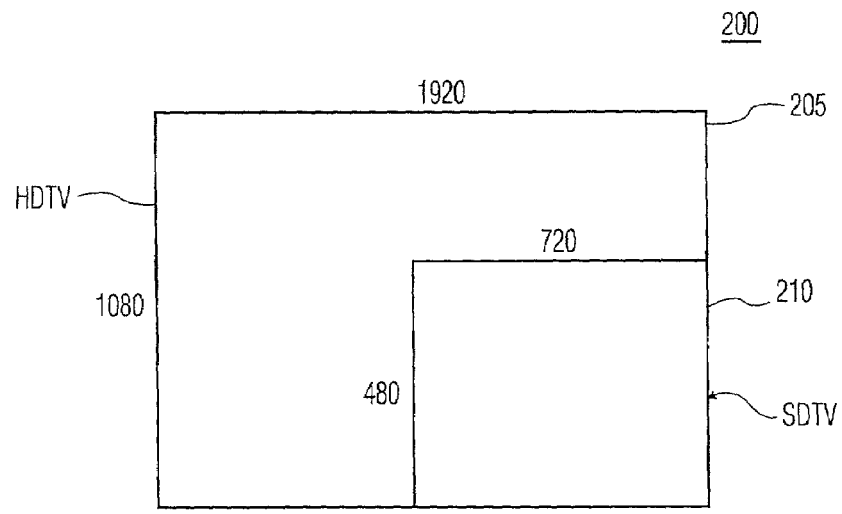
FIG. 2 illustrates exemplary HDTV and SDTV display formats.

FIG. 2 illustrates the image viewing area of a typical NTSC SDTV image superimposed on a HDTV image. In this illustrative example, the viewing area of a transmitted HDTV image is depicted as area 205 and the SDTV image is depicted as area 210. As is illustrated, a significant portion of the HDTV image is lost as only that portion of the HDTV image overlapping the SDTV image is viewable on an SDTV screen.

Figure 3:
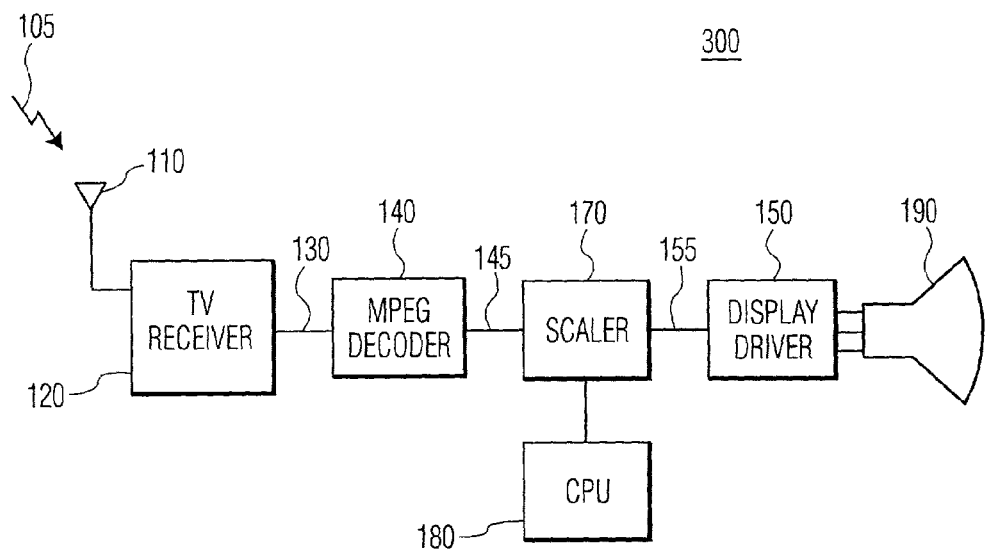
FIG. 3 illustrates an exemplary HDTV receiving system and SDTV display system.

To enable the display of HDTV signals on SDTV screen, the HDTV signal is "downscaled" to compress the HDTV signal. FIG. 3 illustrates the introduction of scaler 170, in the system of FIG. 1 to scale digital signal 145 into scaled signal 155 for viewing on SDTV screen 190. In this case, scaler 170 essentially performs a two-dimensional scaling of the signal 145 to reduce image 205 of FIG. 2 to fit within the bounds of image 210. That is, scaler 170 divides, in this illustrative example, image 205 horizontally by the ratio:

$$\frac{1920}{720} = 2.66$$

and vertically by the ratio:

$$\frac{1080}{486} = 2.22$$

Scaler 170 may further be programmable to appropriately downscale alternative HDTV resolutions. CPU 180 is used illustratively to program scaler 170 to the appropriate downscaling ratios.

Figure 4A:
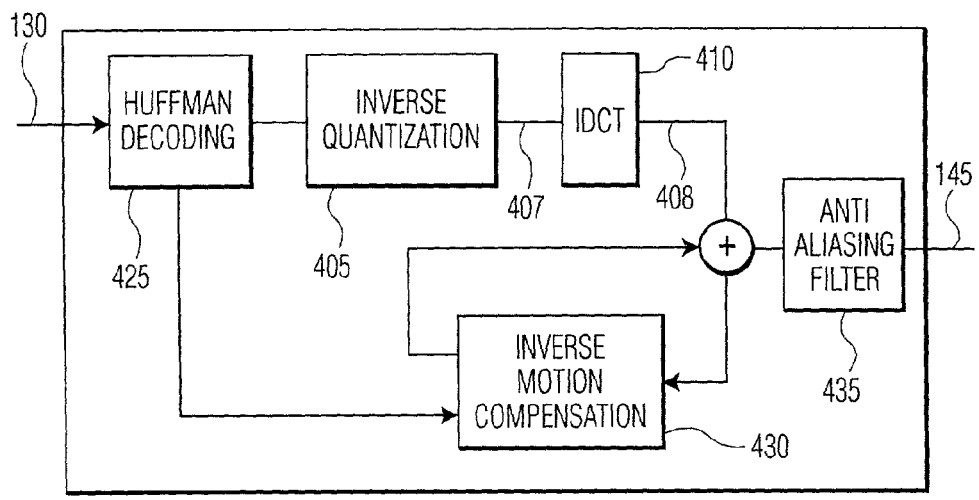
FIG. 4*a* illustrates a functional block diagram of an exemplary MPEG decoding system.

However, decoding and downscaling HDTV signals in the manner disclosed requires a full decoding of the HDTV signal and significant resources. FIG. 4a illustrates an exemplary decoder 140, e.g., MPEG decoder, which is well known in the art and briefly described herein. As illustrated, digital signal 130 is processed by Huffman decoder 425. The Huffman decoded signal is then processed by inverse quantizer 405. Signal 407 is then processed by Inverse DCT (IDCT) 410 to convert the, typically transmitted 8×8 matrix of 64 coefficients into an 8×8 matrix of 64 pixels. The converted signal 408 is then combined with a signal to uncompress the transmitted image by restoring stationary image data and to inverse (436) the motion compensation that was originally applied. The resultant combined signal is now a digital image that is uncompressed and motion compensated. A link between the Huffman decoder 425 and the inverse motion compensation block 436 shows that the Huffman decoder 425 decodes motion vector data prior to their using for inverse motion compensation. The digital image is next applied to anti-aliasing filter 435 to filter the high-frequency components from the image. Anti-aliasing filtering as such is well-known in the art and may e.g. be implemented as a low-pass Finite Impulse Response filter. Anti-aliasing filter 435 softens the edges of the data items within the digital images. Output signal 145 includes pixel information that is representative of video lines used to display an image.

Figure 4B:
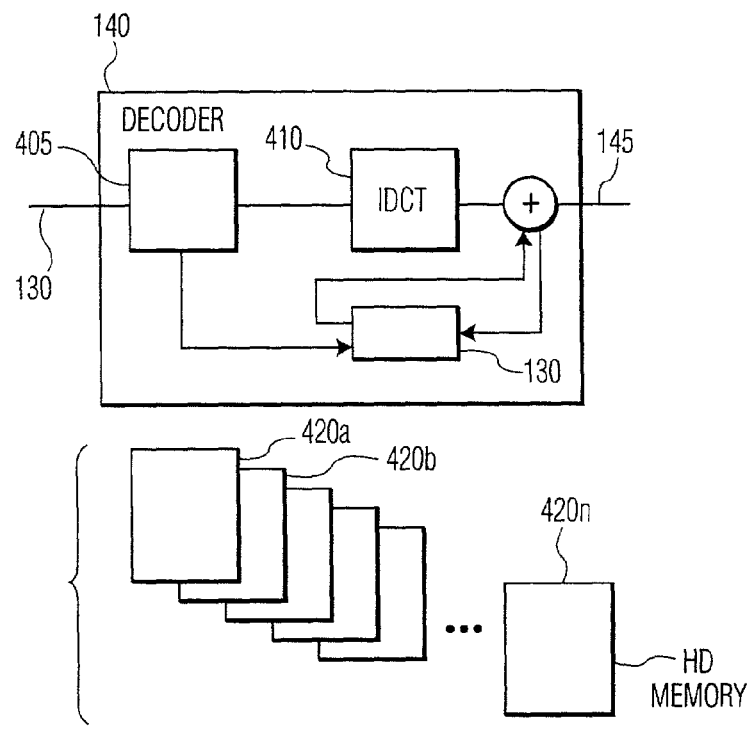
FIG. 4*b* depicts an illustrative block diagram of an exemplary MPEG decoding system.

FIG. 4b illustrates the video memory 420 needed in decoder 140 to perform inverse motion compensation. In this illustrative example, each image is stored on a "page" of video memory. Memory page 420a thus includes pixel information associated with a first image, memory 420b includes pixel information associated with a second image and memory 420n includes the pixel information associated with an "n-th" image. As will be appreciated, storage of each video image requires significant video memory. For example, storing an image having resolution 1920×1080 requires over 2 Megabytes of memory storage.

Figure 5:
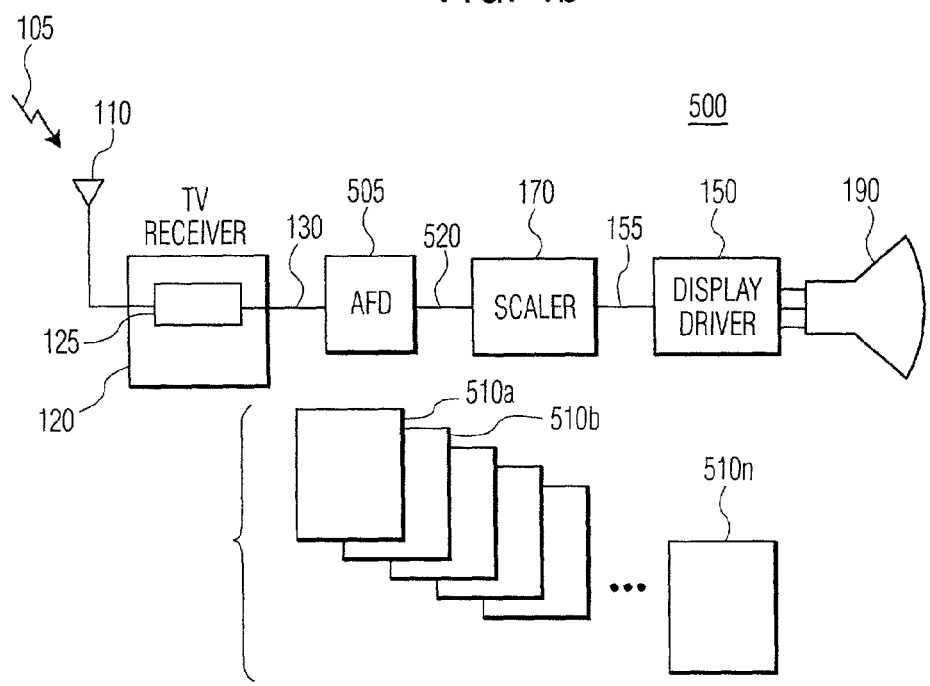
FIG. 5 illustrates an exemplary embodiment of a decoding system in accordance with principles of the invention.

FIG. 5 illustrates the replacement of decoder 140 by AFD (All Format Decoder) 505 in accordance with an embodiment of the invention. In this illustrative embodiment, AFD 505 receives the digital signal 130 and converts it into scaled signal 520. In this case, AFD 505 horizontally scales digital signal 130 to achieve a resolution comparable to the standards of an SDTV image. For example, AFD 505 horizontally downscales digital signal 130 by a factor of two (e.g., resolution 1920 to 960). Horizontally scaled signal 520 is then vertically scaled by scaler 170 to achieve a resolution comparable to the standards of an SDTV image. For example, scaler 170 vertically downscales horizontally scaled signal 520 by a factor of two i.e., resolution 1080 to 540. Accordingly, the downscaled image has a resolution of 980×540.

The use of AFD 505 to downscale the digital signal 130 horizontally is advantageous, as less processing power is needed because digital signal 130 is not decoded at a full resolution and significantly less video memory is necessary to store uncompressed motion compensated video data. Processing power requirements of AFD 505 are significantly reduced, as a selectively chosen reduced data set, e.g., a 4×8 matrix of 32 elements is processed rather than a conventional 8×8 matrix of 64 elements. Further, significantly less video memory is necessary to store the scaled images, as the complete decoded image is not stored, but, rather, only the selectively chosen reduced data set. Reduced memory is illustrated as memory 510a through 510n in FIG. 5. In this case, the video memory requirements to store a horizontally scaled image for inverse motion compensation performing are approximately one Megabyte. In the case that the macroblocks are spatially downscaled prior to the inverse motion compensator, even further reduced data sets are processed, e.g. 4×4 matrix of 16 elements. The output of the AFD 505 is in that case a frame which has been downscaled in both directions thereby making the scaler 170 redundant. In this case, the video memory requirements to store a horizontally and vertically scaled image for inverse motion compensation performing are approximately one-half Megabyte.

Figure 6A:
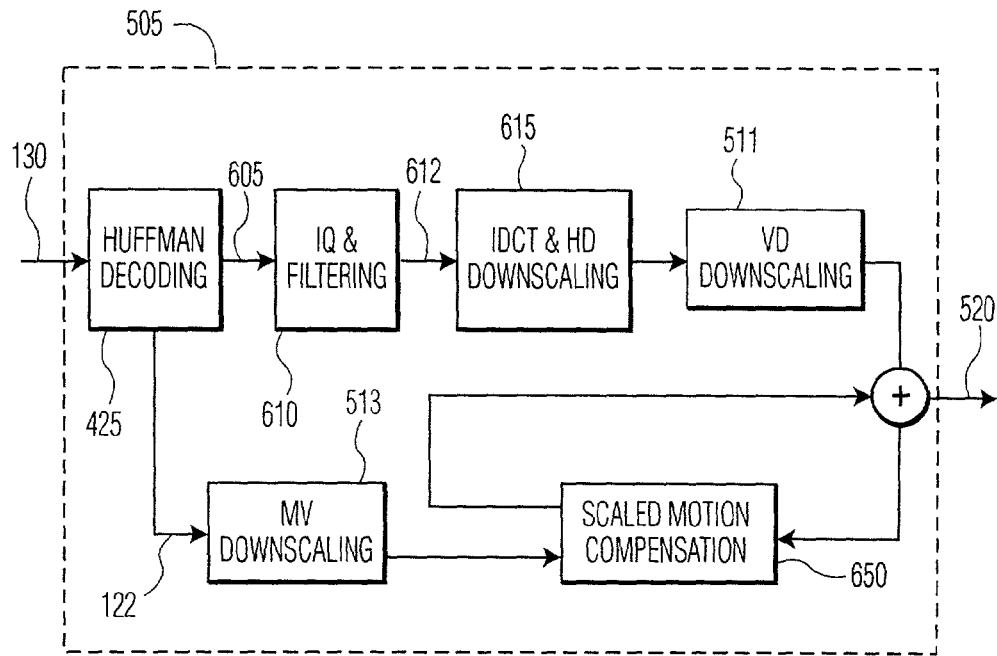
FIG. 6*a* illustrates an exemplary block diagram of a decoding system in accordance with principles of the invention.

FIG. 6a depicts an exemplary functional block diagram of AFD 505. In this illustrative diagram, the digital signal 130 is first processed by the Huffman decoder 425, and then processed by an inverse quantizer and frequency domain filter 610. The output of quantizer/filter 610 is signal 612. Signal 612, as will be shown, has a filtered characteristic similar to the filtered characteristic achieved by anti-aliasing filter 435. Signal 612 is next processed by scalable IDCT 615, which converts the exemplary 64 filtered coefficient elements of the signal 612 to a horizontally scaled signal composed of selectively chosen, for example, 32 pixel elements. The output of the scalable IDCT 615 is then scaled in vertical direction in spatial domain vertical downscaler 511 and merged with a signal from scalable motion compensator 650 to restore the stationary information within an image and inverse the effect of motion compensation. Motion vectors for use in the motion compensator 650 are derived from the Huffman decoder 425 via a motion vector scaler 513. Output signal 520 is a signal having resolution spatially downscaled to be substantially compatible with SDTV television sets.

Figure 6B:
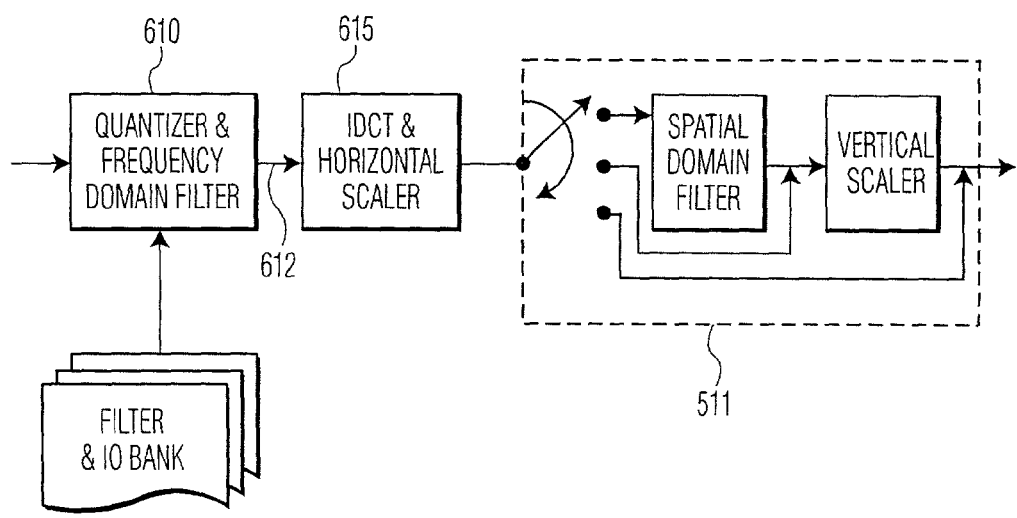
FIG. 6*b* depicts a functional block diagram of part of the exemplary decoding system as shown in FIG. 6*a*.

FIG. 6b illustrates a functional block diagram of part of the exemplary decoder of FIG. 6a. In this functional embodiment of the decoder, the filtered signal 612 produced by the quantizer/filter 610, is processed by the IDCT and Horizontal scaler 615, which transforms the set of coefficients to a reduced set of pixels. In the case interlaced material includes mixed field/frame mode of macroblocks, the decoder can be programmed to spatial domain downscaling the image vertically on macroblock level or on frame level. If macroblock level is chosen, after IDCT 630 each filtered and horizontally downscaled macroblock is processed by spatial filter and scaler in vertical direction if it is frame-type coded. If macroblock is field-type coded it may be processed by scaler without filtering because it may already be filtered in both directions in the frequency domain. Note that vertical frequency domain filter used for field-type coded macroblocks must correspond to spatial domain filter used for frame-type encoded macroblock in order to reduce prediction distortions during inverse motion compensation. If frame level vertical spatial domain downscaling is chosen, any-type coded macroblocks are downscaled horizontally in the IDCT 630 and thereafter processed by motion compensator 650. After performing motion compensation the spatial domain filter and scaler 170 are necessary to spatially downsize the image vertically.

Figure 6C:
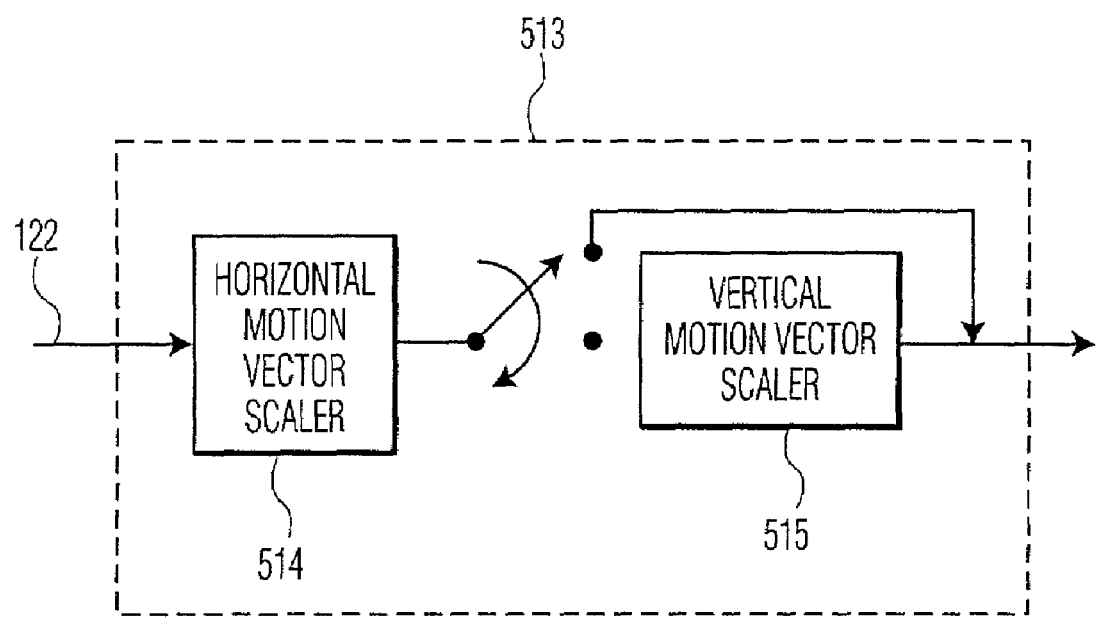
FIG. 6*c* depicts a functional block diagram of an exemplary motion vector downscaling for use in the exemplary decoding system as shown in FIG. 6*a*.

FIG. 6c illustrates a functional block diagram of the motion vector downscaler 513. The motion vector 122 is first processed by Huffman decoder 425, then downscaled horizontally by horizontal motion vector scaler 514, vertically downscaled by vertical motion vector scaler 515 and processed by motion compensator 650. In the case of frame level vertical spatial downscaling, a motion vector has to be downscaled only in vertical direction by vertical motion vector scaler 515.

The selection of frequency domain and corresponded spatial domain filters can now be shown to be related to the convolution—multiplication properties of Discrete Cosine Transform. As is known in the art, the DCT possesses convolution—multiplication properties similar to the Discrete Fourier Transform (DFT). Then for a one-dimensional real sequence a(n), n=0 . . . N−1, and for a one-dimensional real and even sequence h(n), n=−N . . . N−1, it is known that if $$F_c(n) = A_c(n)H_f(n), \text{ for } n=0 \ldots N-1 \quad [1]$$

where $F_c(n)$ is the N-point DCT of f(n);
$A_c(n)$ is the N-point DCT of the real sequence of a(n);
and
$H_f(n)$ is the 2N-point DFT of h(n);
then $$f(k) = a(k) * h(k), \text{ for } k=0 \ldots N-1; \quad [2]$$

where * denotes symmetric convolution operator which can be consider as symmetrically folded result of 2N-length cyclic convolution of sequences h(k) which is odd symmetry sequence expanded to even length by zero and even symmetry sequence $\bar{a}(k)$: can be described as next:

$$\bar{a}(k) = \begin{cases} a(k) & k = 0, 1, \ldots, N-1 \\ a(-1-k), & k = -N, -N+1, \ldots, -1 \end{cases}$$

This relational property between multiplication in the frequency domain and convolution in the time domain can be extended to the two-dimension case as: if $$F_c(n,m) = A_c(n,m)H_f(n,m); \text{ for } n,m=0 \ldots N-1; \quad [3]$$

,then $$f(k,l) = a(k,l) * h(k,l); \text{ for } k,l=0 \ldots N-1 \quad [4]$$

where * denotes two-dimension symmetric convolution operator; $F_c(n,m)$ is the two-dimensional N×N DCT of f(n,m), n,m=0 . . . N−1; $A_c(n,m)$ is the two-dimensional N×N DCT of a(n,m), n,m=0,N−1; $H_f(n,m)$ is the two-dimension 2N×2N DFT of h(n,m), n,m=−N . . . N−1.

As will be appreciated, the two-dimension DCT of the real sequence of a(k,l) creates a matrix wherein the lower frequency elements are contained in the upper left of the matrix and the higher frequency element are contained in the lower right of the matrix. Now, according to equations 3 and 4, filtering in the DCT domain in both directions can be realized by multiplying the received DCT coefficients by a special filter matrix. As an example, the filter matrix of a 3-tap low-pass filter, for example, for impulse response h(n)={0.25,0.5,0.25} in both directions can be obtained the next way. According to equation 1 the frequency response of indicated filter $H_N(n)$ can be obtained by computation of DFT of $h_{2N}(n)$, odd symmetric sequence expanded to 2 N-length by zeros. Two-dimension frequency response can be consider as:

$$HH_N = H_N H_N^T,$$

where denotes kronecker multiplication operator. Therefore for filter h(n) the multiplication matrix will be:

$$HH_N = \begin{bmatrix} 1 & 0.962 & 0.854 & 0.691 & 0.5 & 0.309 & 0.146 & 0.038 \\ 0.962 & 0.925 & 0.821 & 0.665 & 0.481 & 0.297 & 0.141 & 0.037 \\ 0.854 & 0.821 & 0.729 & 0.59 & 0.427 & 0.263 & 0.125 & 0.032 \\ 0.691 & 0.665 & 0.59 & 0.478 & 0.346 & 0.213 & 0.101 & 0.026 \\ 0.5 & 0.481 & 0.427 & 0.346 & 0.25 & 0.154 & 0.073 & 0.019 \\ 0.309 & 0.297 & 0.263 & 0.213 & 0.154 & 0.095 & 0.045 & 0.012 \\ 0.146 & 0.141 & 0.125 & 0.101 & 0.073 & 0.045 & 0.021 & 5.574 \cdot 10^{-3} \\ 0.038 & 0.037 & 0.032 & 0.026 & 0.019 & 0.012 & 5.574 \cdot 10^{-3} & 1.449 \cdot 10^{-3} \end{bmatrix}$$

Accordingly, the frequency domain quantizer/filter can be combined with the inverse quantization function by prior merging of the quantization matrix with the filter matrix H(n, m). More specifically, if the filter matrix is denoted as $HH_N$ as:

$HH_N[hh_{n,m}]$; for $n,m=0 \ldots N-1$

And the Quantization matrix can be described as:

$Q_N=[q_{k,l}]$; for $k,l=0 \ldots N-1$

Then the combined Quantization-Filtering matrix can be described as:

$C_N=[q_{n,m}hh_{n,m}]$; for $n,m=0 \ldots N-1$

It was indicated above that for sequences with mixed field/frame-type encoded macroblocks the frame-type encoded macroblocks must be filtered in frequency domain only in horizontal direction and in spatial domain in vertical direction. Also for frame level spatial vertical downscaling all macroblocks must be filtered in frequency domain only in horizontal direction. In that cases the filter matrix of h(n)={0.25,0.5,0.25} is:

$$H_f(n, m) = \begin{bmatrix} 1.0 & 0.962 & 0.854 & 0.691 & 0.5 & 0.309 & 0.146 & 0.038 \\ 1.0 & 0.962 & 0.854 & 0.691 & 0.5 & 0.309 & 0.146 & 0.038 \\ 1.0 & 0.962 & 0.854 & 0.691 & 0.5 & 0.309 & 0.146 & 0.038 \\ 1.0 & 0.962 & 0.854 & 0.691 & 0.5 & 0.309 & 0.146 & 0.038 \\ 1.0 & 0.962 & 0.854 & 0.691 & 0.5 & 0.309 & 0.146 & 0.038 \\ 1.0 & 0.962 & 0.854 & 0.691 & 0.5 & 0.309 & 0.146 & 0.038 \\ 1.0 & 0.962 & 0.854 & 0.691 & 0.5 & 0.309 & 0.146 & 0.038 \\ 1.0 & 0.962 & 0.854 & 0.691 & 0.5 & 0.309 & 0.146 & 0.038 \end{bmatrix}$$

While there have been shown and described and pointed out fundamental novel features of the present invention as applied to preferred embodiments thereof, it will be understood, that various omissions and substitutions and changes in the methods described may be made by those skilled in the art without departing from the scope of the present invention. Furthermore, although, MPEG decoding is discussed, herein, with regard to HDTV transmission, it will be appreciated by those skilled in the art, that the inventive concept disclosed herein is not limited solely to MPEG coding/decoding, but is applicable to other digital TV coding/decoding techniques.

It is expressly intended that all combinations of those elements and/or method steps which perform substantially the same function in substantially the same way to achieve the same results are within the scope of the invention. Substitutions of elements from one described embodiment to another are also fully intended and contemplated.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

We claim:

1. A method for downscaling a spatial resolution of a first video signal to obtain a second video signal at a lower spatial resolution than the spatial resolution of the first video signal, said method comprising:

frequency domain anti-aliasing filtering and downscaling the first video signal in a first direction corresponding with a line direction in the first video signal to obtain a downscaled video signal; and spatial domain downscaling the downscaled video signal in a second direction perpendicular to the first direction to obtain the second video signal, wherein the first video signal comprises groups of pixels, and if the groups of pixels are included in sequences of field-type end frame-type encoded groups of pixels, then the field-type encoded groups of pixels are frequency domain anti-aliasing filtered in both the first direction and the second direction whereas the frame-type encoded groups of pixels are frequency domain anti-aliasing filtered in the first direction and spatial domain anti-aliasing filtered in the second direction.

2. The method as claimed in claim 1, wherein the downscaling the first video signal is performed prior to or during an inverse transform operation.

3. The method as claimed in claim 2, wherein the inverse transform operation is followed by an inverse motion compensation prior to the spatial domain downscaling.

4. The method as claimed in claim 2, wherein the inverse transform operation is followed by the spatial domain downscaling prior to an inverse motion compensation.

5. The method as claimed in claim 1, wherein the first video signal comprises quantized frequency transform coefficients, wherein the method further comprises inverse quantizing the quantized frequency transform coefficients to obtain frequency transform coefficients, wherein the anti-aliasing filtering is performed on the frequency transform coefficients, and wherein said inverse quantizing step and said filtering step are performed by using a combined matrix which is a combination of a quantization matrix and a filter matrix.

6. An apparatus for downscaling a spatial resolution of a first video signal to obtain a second video signal at a lower spatial resolution than the spatial resolution of the first video signal, said apparatus comprising:

means for frequency domain anti-abasing filtering and for downscaling the first video signal in a first direction corresponding with a line direction in the first video signal to obtain a downscaled video signal, and means for spatial domain downscaling the downscaled video signal in a second direction perpendicular to the first direction to obtain the second video signal, wherein the first video signal comprises groups of pixels, and if the groups of pixels are included in sequences of field-type and frame-type encoded groups of pixels, then the field-type encoded groups of pixels are frequency domain anti-aliasing filtered in both the first direction and the second direction whereas the frame-type encoded groups of pixels are frequency domain anti-aliasing filtered in the first direction and spatial domain anti-aliasing filtered in the second direction.

7. An apparatus, comprising:

an All Format Decoder (AFE)) adapted to receive a digital signal and to convert the digital signal into a scaled signal, the AED further comprising a horizontal scaler adapted to horizontally scale the digital signal; and a spatial domain scaler coupled to the horizontal scaler and adapted to vertically scale an output from the horizontal scaler, wherein the digital signal comprises groups of pixels, and if the groups of pixels are included in sequences of field-type and frame-type encoded groups of pixels, then the field-type encoded groups of pixels are frequency domain anti-aliasing filtered both horizontally and vertically whereas the frame-type encoded grouns of pixels are frequency domain anti-aliasing filtered horizontally and spatial domain anti-aliasing filtered vertically.

8. The apparatus as claimed in claim 7, further comprising a motion vector scaler adapted to provide motion vectors to a motion compensator, wherein the motion compensator provides an output that is combined with an output from the spatial domain scaler.

9. The apparatus as recited in claim 7, wherein the spatial domain scaler further comprises a spatial domain vertical downscaler.

10. The apparatus as recited in claim 7, wherein the apparatus is a receiver adapted to receive a high definition television (HDTV) signal and provide a standard definition television (SDTV) signal.

11. The apparatus as recited in claim 8, wherein the AFD further comprises a Huffman decoder.

12. The apparatus as recited in claim 11, wherein the Huffman decoder is coupled to an inverse quantizer and frequency domain filter.

13. The apparatus as recited in claim 7, wherein the horizontal scaler further comprises an inverse discrete cosine transform (IDCT) device.

14. The apparatus as recited in claim 11, wherein the motion vector scaler further comprises a horizontal motion vector downscaler and a vertical motion vector downscaler.

15. The apparatus as recited in claim 14, wherein the motion vector scaler is coupled to the Huffman decoder.

16. The apparatus as recited in claim 14, wherein an output of the horizontal motion downscaler bypasses the vertical motion downscaler.

17. An The apparatus as recited in claim 14, wherein an output of the horizontal motion downscaler is input to the vertical motion downscaler.

* * * * *